Jan. 21, 1936.                H. C. LORD                2,028,550
                               MOUNTING
                      Original Filed Sept. 15, 1932
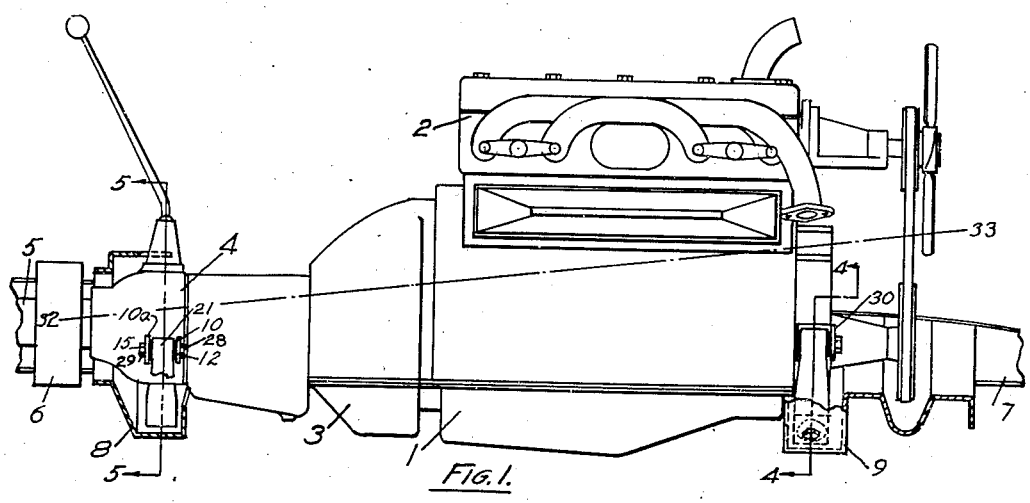
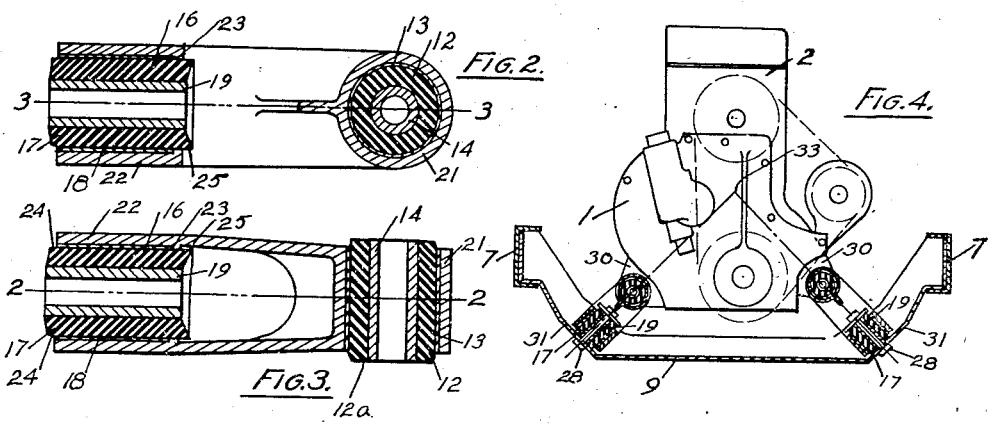
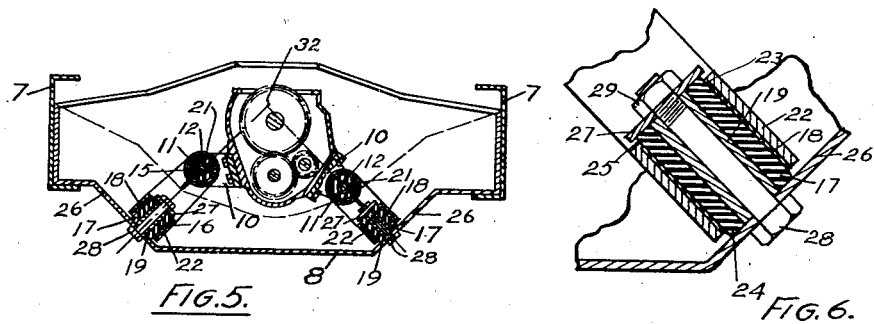
INVENTOR.
Hugh C. Lord Patented Jan. 21, 1936

2,028,550

UNITED STATES PATENT OFFICE 2,028,550

MOUNTING

Hugh C. Lord, Erie, Pa.

Application September 15, 1932, Serial No. 633,324
Renewed December 2, 1935

17 Claims. (Cl. 248—7)

The present invention is designed to provide a mounting for vibrating instruments. It is particularly effective for instruments having torque impulses, such, for example, as an automobile engine and some phases of the invention are directed to such a mounting. In such instruments there are usually not only torque vibrations, but vibrations of other characteristics, such for instance, as arise from unbalanced conditions of the moving parts. It is desirable, therefore, to provide a mounting which will be sensitively responsive to both torque and other impulses tending to create vibration so that such impulses and vibrations may be insulated from the support on which the instrument is mounted. In an application filed by me, Jan. 25, 1932, Serial Number 588,685, I have disclosed a mounting in which a vibrating instrument is suspended on converging inclined links, these links being pivotally mounted with rubber joint members at the pivots yieldingly resisting the swinging movement of the links under vibration and cushioning the action of the links. In many environments, it is much more desirable to sustain the vibrating instrument above the actual support and in the present invention links are used as vibration absorbing connections, which links, or at least some of them, project upwardly from the support toward the vibrating member. This permits in many environments, such as an automobile, of carrying the vibrating instrument on a convenient base, or support, without sacrificing materially in the vibration absorption qualities of the connection. Features and details of the invention will appear from the specification and claims.

A preferred embodiment of the invention is illustrated in the accompanying drawing as follows:—

Fig. 1 shows a side elevation of an automobile engine, the frame members at the near side of the engine being removed to show construction.

Fig. 2 an enlarged view of one of the connecting links in section on the line 2—2 in Fig. 3.

Fig. 3 a similar view in section on the line 3—3 in Fig. 1.

Fig. 4 a section on the line 4—4 in Fig. 1.

Fig. 5 a section on the line 5—5 in Fig. 1.

Fig. 6 an enlarged view of the frame end of one of the connections.

1 marks the engine proper which includes the cylinder block 2 and has the usual bell housing 3 and gear box 4 connected therewith. A propeller shaft 5 is connected to the gear box through universal joints 6 in the usual manner. The frame of the automobile comprises the usual side frames 7 and cross members 8 and 9 conveniently located with relation to the engine to support the front and rear ends thereof. Brackets 10 are secured at the sides of the gear box and rubber joints 11 are secured in the brackets. These joints preferably have a rubber bushing 12, an outer shell 13, and an inner sleeve 14, with the rubber secured in place therein, preferably by a surface union of the rubber bushing with the shell and sleeve. A bolt 15 extends through ears 10a of the bracket clamping these ears against the end of the sleeve so as to lock the sleeve with the bracket. A mounting 16, preferably including the bushing 17, outer shell 18, and inner sleeve 19 is also provided and this is connected by a shackle link 20, the upper end of the shackle link having a sleeve 21 into which the shell 13 is pressed and the lower end of the shackle link having a sleeve 22 into which the shell 18 is pressed, the sleeve 22 being provided with a shoulder 23 at the upper end engaging the end of the shell 18 so as to assist in preventing endwise movement.

There are two of these links, one at each side, of the gear box resting on the cross member 8, the cross member having the inclined portion of its flange 26 at right angles to the direction of the link. The rubber bushing 17 of the mounting 16 is provided with an extension 24 at its lower end and an extension 25 at its upper end. The lower extension is adapted to contact the flange 26 and the other extension to abut and engage a washer 27. A bolt 28 extends through the mounting and is secured by a nut 29 at its upper end. The mounting yields under load and vibration in shear and the normal vibrations are so supported, but abnormal thrusts are resisted by the engagement of the extensions 27. A similar link construction is arranged at the front end of the motor. Brackets 30 extend from the outer faces of the crank case of the engine and the cross member 9 has inclined portions 31. The shackle links and joints in this structure correspond to the joints and mountings at the rear, the lower mounting resting on the flange 31 and the upper joint being secured between the ears 30. As the engine is subjected to torque impulses, these impulses are yieldingly absorbed by the mounting, the links swinging in response to such impulses on pivots having axes in the general direction of the axis of the rotating element although it may be slightly inclined as shown, the pivotal action of the upper joints being around their central pins and the pivotal action of the lower joints being accomplished by a rocking movement of their central pins across the axis of the joints. The links project upwardly toward the engine and are inclined relatively to each other and converge at the points 32 and 33 at the rear and front respectively and preferably this converging point extends to a line on the center of gravity of the engine. The links arranged as suggested compel any oscillatory movement to be centered on the line 32—33 and this oscillatory movement is yieldingly resisted by the rubber under distortion in all of the joints. The rubber as arranged is ordinarily sufficient without external means to sustain the torque impulses of the engine, but other means may be added, if desired.

Other vibrations of the engine are cushioned by the rubber mountings, particularly those at the rear, which mountings respond to such other vibrations very largely through a yielding of the rubber in shear. Thus a very sensitive mounting so far as such vibrations are concerned is afforded and the joints 11 which are subjected to the greater swinging movement receive the torque impulses in shear.

The mounting with its links extending upwardly permits of its arrangement in many environments with the frame below the vibrating instrument and this is of particular consequence in an automobile in that it places the cross members carrying the engine below the engine and consequently gives easy access to the upper parts of the engine and at the same time places the cross members in a position to definitely brace the frame.

What I claim as new is:—

1. A mounting for absorbing vibrations of a vibrating member having a rotating element comprising supporting members; and connections between the supporting and vibrating members including relatively inclined converging links, each link having a pivotal joint at least at one end with the pivotal axis in the same general direction as the axis of the rotating element, said links swinging to permit vibratory rocking of the vibrating member on an axis extending in the general direction of the axis of the rotating element and projecting upwardly from the supporting members toward the vibrating member, said links being rubber cushioned and some of the cushions at least being disposed to yieldingly resist the swinging movement of the vibrating member.

2. A mounting for absorbing vibrations of a vibrating member having a rotating element comprising supporting members; and connections between the supporting and vibrating members at both ends of the vibrating member including pairs of converging relatively inclined links, each link having a pivotal joint at least at one end with the pivotal axis in the same general direction as the axis of the rotating element, said links swinging to permit vibratory rocking of the vibrating member on an axis extending in the general direction of the axis of the rotating element and at least one pair of the links projecting upwardly from the supporting members toward the vibrating member, said links being rubber cushioned and some of the cushions at least being disposed to yieldingly resist the swinging movement of the vibrating member.

3. A mounting for absorbing vibrations of a vibrating member having a rotating element comprising supporting members; and connections between the supporting and vibrating members including relatively inclined converging links, each link having a pivotal joint at least at one end with the pivotal axis in the same general direction as the axis of the rotating element and projecting upwardly from the supporting members toward the vibrating member, said links being provided with rubber cushions at each end disposed to yieldingly resist the oscillatory movement of the vibrating member.

4. A mounting for absorbing vibrations of a vibrating member having a rotating element comprising supporting members; and connections between the supporting and vibrating members at both ends of the vibrating member including pairs of converging relatively inclined links, each link having a pivotal joint at least at one end with the pivotal axis in the same general direction as the axis of the rotating element and at least one pair of the links projecting upwardly from the supporting members toward the vibrating member, said links being provided with rubber cushions at each end disposed to yieldingly resist the oscillatory movement of the vibrating member.

5. A mounting for absorbing vibrations of a vibrating member having a rotating element comprising supporting members; and connections between the supporting and vibrating members including relatively inclined converging links, each link having a pivotal joint at least at one end with the pivotal axis in the same general direction as the axis of the rotating element and projecting upwardly from the supporting members toward the vibrating member, said links having rubber cushions at least at one end, said cushions being disposed to carry the major portion of their load in shear and having means yieldingly resisting the swinging movement of the links.

6. A mounting for absorbing vibrations of a vibrating member having a rotating element comprising supporting members; and connections between the supporting and vibrating members at both ends of the vibrating member including pairs of converging relatively inclined links, each link having a pivotal joint at least at one end with the pivotal axis in the same general direction as the axis of the rotating element and at least one pair of the links projecting upwardly from the supporting members toward the vibrating member, said links having rubber cushions at least at one end, said cushions being disposed to carry the major portion of their load in shear and having means yieldingly resisting the swinging movement of the links.

7. A mounting for absorbing vibrations of a vibrating member having a rotating element comprising supporting members; and connections between the members supporting and vibrating including relatively inclined converging links, each link having a pivotal joint at least at one end with the pivotal axis in the same general direction as the axis of the rotating element and projecting upwardly from the supporting members toward the vibrating member, said links having rubber cushions at each end of each link disposed to yieldingly resist the swinging movement of the links and one rubber cushion at least of each link having the rubber disposed to carry the load in shear.

8. In a mounting for an automobile, the combination of a frame; an engine mounted in the frame; and connections between the frame and the engine including a pair of relatively inclined converging links projecting upwardly from the frame toward the engine, said links being pivotally connected at least at one end with the pivotal axis extending longitudinally of the engine and swinging in response to the torque impulses of the engine to permit the rocking of the engine on a longitudinal axis and having means yieldingly resisting the swinging movement of the links.

9. In a mounting for an automobile, the combination of a frame; an engine mounted in the frame; and connections between the frame and the engine including pairs of relatively inclined converging links carrying both ends of the engine, the pair at one end at least projecting upwardly from the frame tward the engine and each link having a pivotal connection at least at one end of the link with the pivotal axis extending longitudinally of the engine, said links permitting the rocking of the engine on a longitudinal axis and having means yieldingly resisting the swinging movement of the links.

10. In a mounting for an automobile, the combination of a frame; an engine mounted in the frame; and connections between the frame and the engine including a pair of relatively inclined converging links projecting upwardly from the frame toward the engine, said links being pivotally connected at least at one end with the pivotal axis extending longitudinally of the engine and swinging in response to the torque impulses of the engine to permit the rocking of the engine on a longitudinal axis, said links being rubber cushioned, some of the cushions yieldingly resisting the swinging action of the links.

11. In a mounting for an automobile, the combination of a frame; an engine mounted in the frame; and connections between the frame and the engine including pairs of relatively inclined converging links carrying both ends of the engine, the pair at one end at least projecting upwardly from the frame toward the engine and each link having a pivotal connection at least at one end of the link with its pivot extending longitudinally of the engine, said links permitting the rocking of the engine on a longitudinal axis being rubber cushioned with the rubber operatively connected therewith, some of the cushions yieldingly resisting the swinging action of the links.

12. In a mounting for an automobile, the combination of a frame; an engine mounted in the frame; and connections between the frame and the engine including two pairs of relatively inclined converging links projecting from the frame toward the engine, each of said links comprising a rubber cushioned pivotal joint at the engine end of the link operatively connected with the link and having its pivot extending longitudinally of the engine and a rubber cushioned mounting and joint at the frame end of the link operatively connected therewith, said mountings having the rubber disposed to support the major portion of its vibratory load in shear, said rubber joints being disposed to yieldingly resist the swinging action of the links and one of said pairs of joints having its links projecting upwardly from the frame toward the engine.

13. A mounting for absorbing vibrations of a vibrating member having a rotating element comprising supporting members and connections between the supporting and vibrating members including links converging toward the axis of oscillation of the vibrating member, each link having a pivotal joint at least at one end with the pivotal axis in the same general direction as the axis of the rotating element, said links swinging to permit vibratory rocking of the vibrating member on an axis in the general direction of the axis of the rotating element and projecting upwardly from the supporting members and disposed between the supporting members and the vibrating member to place the links under compression and said connections having means yieldingly resisting the rocking of the links.

14. A mounting for absorbing vibrations of a vibrating member having a rotating element comprising supporting members and connections between the supporting and vibrating members at points spaced axially of the rotating element of the vibrating member including pairs of links converging toward the axis of oscillation of the vibrating member, each link having a pivotal joint at least at one end with the pivotal axis in the same general direction as the axis of the rotating element, said links swinging to permit vibratory rocking of the vibrating member on an axis in the general direction of the axis of the rotating element, at least one pair of the links projecting upwardly from the supporting members and disposed between the supporting members and the vibrating member to place the links under compression and said connections having means yieldingly resisting the rocking of the links 15. A mounting for absorbing vibrations of a vibrating member having a rotating element comprising supporting members and connections between the supporting and vibrating members including links converging toward the axis of oscillation of the vibrating member, each link having a pivotal joint at least at one end with the pivotal axis in the same general direction as the axis of the rotating element, said links swinging to permit vibratory rocking of the vibrating member on an axis in the same general direction of the axis of the rotating element and projecting upwardly from the supporting members and disposed between the supporting members and the vibrating member to place the links under compression, said links being rubber-cushioned and some of the cushions at least being disposed to yieldingly resist the swinging of the vibrating member.

16. A mounting for absorbing vibrations of a vibrating member having a rotating element comprising supporting members and connections between the supporting and vibrating members including links converging toward the axis of oscillation of the vibrating member, each link having a pivotal joint at least at one end with the pivotal axis in the same general direction as the axis of the rotating element, said links swinging to permit vibratory rocking of the vibrating member on an axis in the same general direction of the axis of the rotating element and projecting upwardly from the supporting members and disposed between the supporting members and the vibrating member to place the links under compression, said links being rubber-cushioned and some of the cushions at least being disposed to carry the major portion of their load in shear and to yieldingly resist the swinging movement of the vibrating member.

17. A mounting between a unit subjected to torque-induced vibrations and a support including relatively inclined converging swinging connectors between the unit and support converging toward the axis of vibration and carrying the gravity load with the connectors in compression, the connectors having pivotal rubber cushions at least at one end.

HUGH C. LORD.